US008744236B2

(12) United States Patent
Hessels

(10) Patent No.: US 8,744,236 B2
(45) Date of Patent: Jun. 3, 2014

(54) METHOD APPARATUS FILM AND SYSTEM FOR FILM VIEWING WITH APPARATUS LOCATION CONTROL

(75) Inventor: Derwin Scott Hessels, Singapore (SG)

(73) Assignee: Nanyang Technological University, Singapore (SG)

(*) Notice: Subject to any disclaimer, the term of this patent is extended or adjusted under 35 U.S.C. 154(b) by 1144 days.

(21) Appl. No.: 12/672,457

(22) PCT Filed: Aug. 13, 2007

(86) PCT No.: PCT/SG2007/000250
§ 371 (c)(1),
(2), (4) Date: Feb. 7, 2011

(87) PCT Pub. No.: WO2009/022983
PCT Pub. Date: Feb. 19, 2009

(65) Prior Publication Data
US 2011/0116765 A1 May 19, 2011

(51) Int. Cl.
H04N 9/80 (2006.01)
H04N 5/77 (2006.01)

(52) U.S. Cl.
USPC ........... 386/239; 386/227; 386/240; 386/241; 386/248

(58) Field of Classification Search
USPC .................. 386/227, 239, 240, 241, 248
See application file for complete search history.

(56) References Cited

U.S. PATENT DOCUMENTS 4,305,131 A    12/1981  Best
6,526,351 B2*   2/2003  Whitham ................. 701/438
6,678,609 B1    1/2004  Duckeck et al.
7,089,264 B1*   8/2006  Guido et al. ................... 1/1
7,149,961 B2   12/2006  Harville
2004/0221227 A1* 11/2004 Wu ............................. 715/512
2006/0064733 A1  3/2006  Norton et al.
2009/0024559 A1* 1/2009  Arrasvuori ................. 707/1

FOREIGN PATENT DOCUMENTS

AU        668847 B3      5/1996
EP       1271458 A2      1/2003
WO    WO-97/17685 A1     5/1997
WO    WO-01/86613 A2    11/2001
WO   WO-2004/100166 A2  11/2004

OTHER PUBLICATIONS

"International Application Serial No. PCT/SG2007/000250, International Preliminary Report on Patentability completed Aug. 4, 2009", 8 pgs.

(Continued)

Primary Examiner — Daquan Zhao
(74) Attorney, Agent, or Firm — Schwegman Lundberg & Woessner, P.A.

(57) ABSTRACT

A system for playing a film on a portable media player, the portable media player comprising a central processor, a GPS module to determine a location of the portable media player within a geographic area, and a storage having stored therein film data of the film for playing on the portable media player, as well as location data of a plurality of locations in a geographic area; the film data comprising at least one preliminary scene to be played first, and a plurality of subsequent scenes, each of the subsequent scenes being linked to both the preliminary scene and one of the locations. A corresponding portable media player, film and method are also disclosed.

30 Claims, 6 Drawing Sheets

(56) References Cited

OTHER PUBLICATIONS

"International Application Serial No. PCT/SG2007/000250, International Search Report mailed Jan. 14, 2008", 4 pgs.

"International Application Serial No. PCT/SG2007/000250, Written Opinion mailed Apr. 23, 2009", 6 pgs.

"International Application Serial No. PCT/SG2007/000250, Written Opinion mailed Jul. 2, 2008", 6 pgs.

Davies, N., et al., "Future Wireless Applications for a Networked City: Services for Visitors and Residents", *IEEE Wireless Communications*, (Feb. 2002), 8-16.

Vlahakis, V., et al., "Personalized Augmented Reality Touring of Archaeological Sites with Wearable and Mobile Computers", *Proceedings on the 6th International Symposium on Wearable Computers (ISWC '02)*, (2002), 8 pgs.

\* cited by examiner

METHOD APPARATUS FILM AND SYSTEM FOR FILM VIEWING WITH APPARATUS LOCATION CONTROL

RELATED APPLICATIONS

This application is a nationalization under 35 U.S.C. 371 of PCT/SG2007/000250, filed Aug. 13, 2007 and published as WO 2009/0229553 A1 on Feb. 19, 2009, which application and publication are incorporated herein by reference and made a part hereof.

TECHNICAL FIELD

This invention relates to a method, apparatus, film and system for film viewing with apparatus location control and refers particularly, though not exclusively, to such a method, apparatus, film and system that uses the location of the apparatus to control the progress of the film.

DEFINITIONS

Throughout this specification a reference to a film is to be taken as including a reference to a motion picture, movie, film, film clip, documentary, video, video clip, and trailers for the aforesaid. They may be in any suitable digital format.

BACKGROUND

Known GPS applications are used to locate an object or person, determine a way of moving between locations, and locating resources near to a location. Also, viewer involvement in films they are viewing has been limited to selecting icons that represent different branches of the story of the film (US2006/0064733) or providing a vocal input in response to a question of an actor in the film (U.S. Pat. No. 4,305,131). These are predetermined and preset and cannot take into account the varying locations in which the viewer may be situated at any stage in the film.

Also, handheld devices are being used in locations such as, for example, museums and art galleries to provide to attendees at the museum, gallery, or the like, relevant information regarding the exhibit to which they are adjacent. These normally use low-level radio broadcast systems such as, for example, RFID, Bluetooth, and so forth. There is no user interaction, nor viewer location control.

SUMMARY

According to an exemplary aspect there is provided a portable media player comprising a central processor, a GPS module configured to determine a location of the portable media player; and a storage configured to store film data of the film for playing on the portable media player, as well as location data of a plurality of locations in a geographic area; the film data comprising at least one preliminary scene and a plurality of subsequent scenes, each of the subsequent scenes being linked to both the preliminary scene and one of the locations.

According to another exemplary aspect there is provided a film for playing on a portable media player, the film comprising at least one preliminary scene and a plurality of subsequent scenes, each of the subsequent scenes being linked to both the at least one preliminary scene and one of a plurality of locations.

According to a further exemplary aspect there is provided a method for playing a film on a portable media player, the method comprising: playing a preliminary scene of the film; using a GPS module and a processor of the portable media player to determine a location of the portable media player within a geographic area; and playing at least one subsequent scene of a plurality of subsequent scenes, each of the subsequent scenes being linked to both the preliminary scene and a location of a plurality of locations within the geographic area.

According to yet another exemplary aspect there is provided a system for playing a film on a portable media player, the portable media player comprising a central processor, a GPS module to determine a location of the portable media player within a geographic area, and a storage having stored therein film data of the film for playing on the portable media player, as well as location data of a plurality of locations in a geographic area; the film data comprising at least one preliminary scene to be played first, and a plurality of subsequent scenes, each of the subsequent scenes being linked to both the preliminary scene and one of the locations.

For all aspects each of the plurality of locations may be defined by a zone of a plurality of zones. Each of the plurality of zones may be defined by a grid pattern. Each of the subsequent scenes may be linked to one of the zones of the plurality of zones. Each of the subsequent scenes for the zone may comprise a first scene to be played first and at least one further scene to be played after the first scene. The first scene and the at least one further scene may be of differing durations. Data of each of the plurality of locations may form part data of the film. When the portable media player moves from a first zone to a second zone, the scenes of the plurality of subsequent scenes being played may be changed from those linked to the first zone to those linked to the second zone. Each of the plurality of zones may have at least one of: a unique identifying number, a unique identifying title, and a summation of the scenes linked to that zone. When the portable media player moves randomly within the geographic area, the scenes of the plurality of subsequent scenes may be played in the order of the zones through which the portable media player passes. Each of the plurality of subsequent scenes may be independent of the other of the plurality of subsequent scenes but may be linked to, and may be used to reveal more information about, the at least one preliminary scene. The portable media player may also display a map of the geographic location with the grid pattern on the map, the location of the media player relative to the map as determined by the GPS module also being displayed on the map to determine how close the media player is to the next zone. Both the film and the map may be displayed using split screen technology, or may be sequentially displayed by toggling between the film and the map. A definition of the scene for the zone in which the media player is located may also be displayed with the map.

According to a final exemplary aspect there is provided a computer useable medium comprising a computer program code that is configured to cause a processor to execute one or more functions to enable a portable media player to play a film in the manner described above. The film may be in a suitable digital format and may be stored on a computer useable medium comprising a computer program code that is configured to cause a processor to execute one or more functions to enable a portable media player to play the film.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

Figure 1:
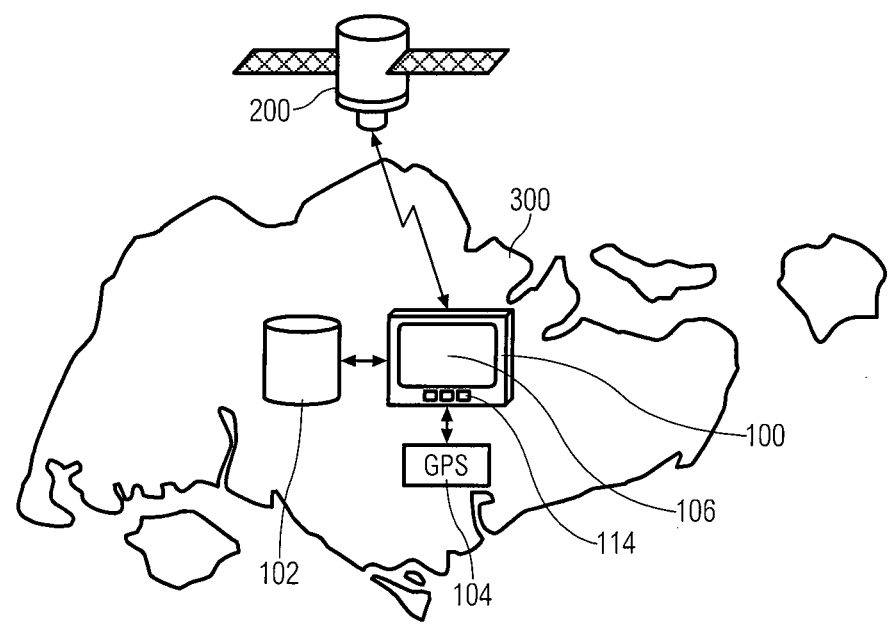
FIG. 1 is an illustration of the system architecture.

As shown in FIG. 1 the system and apparatus comprises a hand-held media player 100 having a database 102 and a GPS module 104. The GPS module 104 communicates in a known manner with one or more satellites 200 and receives coordinates data from the one or more satellites 200, the coordinates data being the coordinates of the location of the media player 100 on a known geographic region 300. The database 102 stores film (audio and visual) data for display on a screen 106 of the media player 100. The data is divided into a plurality of scenes, each of which is relevant for a zone of the geographic region 300. The scene displayed on the screen 106, and the audio played, will be in accordance with the coordinates data as received from the at least one satellite 200. The media player 100 is a hand-held and portable device, preferably battery powered, and is able to move relatively freely within the geographic area 300.

Figure 2:
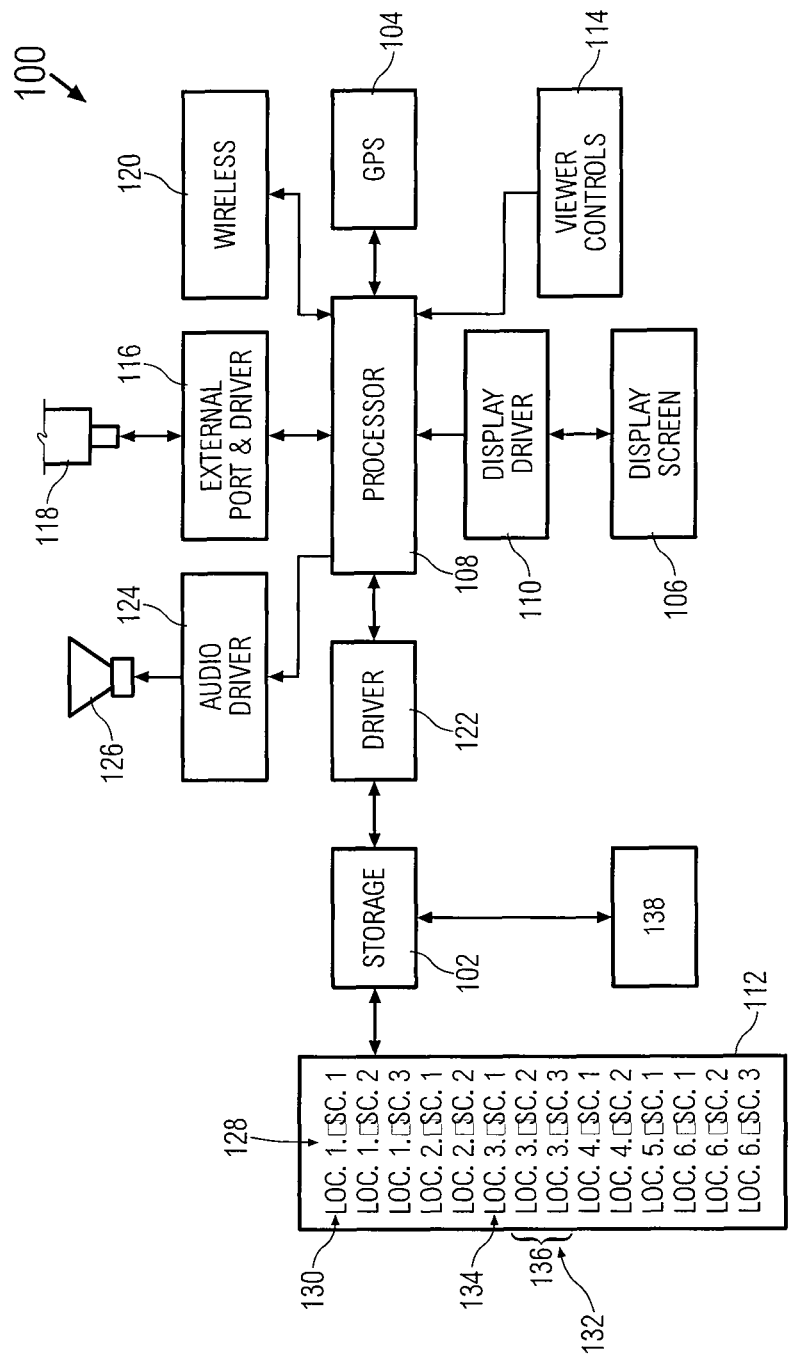
FIG. 2 is a front elevation of an exemplary hand-held media player

FIG. 2 illustrates the structure of the hand-held media player 100. It has a central processor 108 operatively connected to the display screen 106 via a display driver 110. It also has the GPS module 104 that is also operatively connected to the processor 108. The storage 102 is also operatively connected to the processor via a storage driver/controller 122. The storage 102 is a non-volatile storage for storing the data of a film 112. The data of the film 112 is for display on the display screen 106, and reproduction of the audio by one or more speakers 126 (or headphones via an earphone socket) using an audio driver 124. The audio driver 124 may include a digital-to-analog converter ("DAC"). Alternatively, the DAC may form part of the central processor 108. The storage 102 also includes data 138 of all the zones relevant for the film with each zone being defined by its location. This may be by defining the boundaries of the zone, the extent of the area of the zone, or otherwise as required or desired. The location data 138 may form part of the film data 112. Viewer controls 114 are used to control the operation of the media player 100 in a known manner.

The media player 100 may also have the ability to download films. This may be by having a port and associated driver 116 able to releasably receive therein a machine-readable external storage device 116 such as, for example a USB flash drive 118, CD-ROM, DVD, external disc drive, or the like. Alternatively or additionally, they may be downloaded wirelessly using a wireless module 120. Both the port 116 and wireless module 120 are operatively connected to the processor 108. Further alternatively, the external storage device 118 may be used in place of, or in addition to, the storage 102 so that the data of the film 112 is stored on external device 118. In this way the film 112 can be permanently stored in device 118 on a read-only basis, and the film 112 played whenever the device 118 is connected to the port 116.

The film 112 has a plurality of scenes 128. The scenes 128 are able to be played in any order including a random order as the viewer may move between locations in a random sequence. However, there is at least one preliminary scene 130 that is played first whenever the film 112 is played irrespective of the location of the device 100 at the time the film is started. All of the subsequent scenes 132 are in some way linked to the at least one preliminary scene 130. Each subsequent scene 132 is independent of the other subsequent scenes 132 but is linked to, and is used to reveal more information about, the preliminary scene.

There may be one scene for a zone, or a plurality of scenes for a zone. The duration of the scene for a zone, or the plurality of scenes for a zone, is linked to the time that would be taken for a viewer to travel through a zone. As this may vary, there are preferably a plurality of scenes for each zones so that if the viewer travels through the zone quite quickly, a first scene (e.g. scene 134 being location 3, scene 1) is able to be played in the time it takes the viewer to travel through the zone at the fast speed. The first scene 134 contains all of the essential information required for the viewer for that zone. The additional scenes for that zone (e.g. scenes 136 being location 3, scenes 2 and 3) contain extra information not essential to the understanding of the film and therefore can be not played without impacting on the viewer's understanding of the film 112, or their experience in viewing the film 112. naturally, if the viewer travels across the zone quite slowly, all scenes for that zone are able to be played; and if the viewer travels across the zone at an intermediate speed, more than one scene for that zone can be played, but not all scenes for that zone will be played. In all cases, the first scene 134 for a zone is played first when the media player 100 is in that particular zone—but always after the preliminary scene 130. The scenes being played change to those relevant for a new zone whenever the media player 100 moves to the new zone. Preferably, the first scene 134 contains images and/or audio relevant for that zone—for example, it may contain establishment clips or shots of buildings or building complexes that distinguish that zone 302.

As each of the scenes 128 has a known duration, and as the GPS module 104 is constantly and repeatedly determining the location of the media player 100, the processor 108 can determine the speed of travel of the media player 100, the average direction of travel, and the likely next zone. It can also determine with continuing refinement when the media player 100 is likely to move from one zone to the adjacent zone. As such it can select those of the scenes 136 most likely to be completed while the media player 100 is within the zone, but will be completed just before the media player 100 moves into the next zone. It is therefore preferred that each of the scenes 136 is of a different duration.

The zones need not have common boundaries. However, it is preferred that they do so to facilitate transfer from one zone to another. The zones may overlap to a small extent such as is often used for cellular networks.

Figure 3:
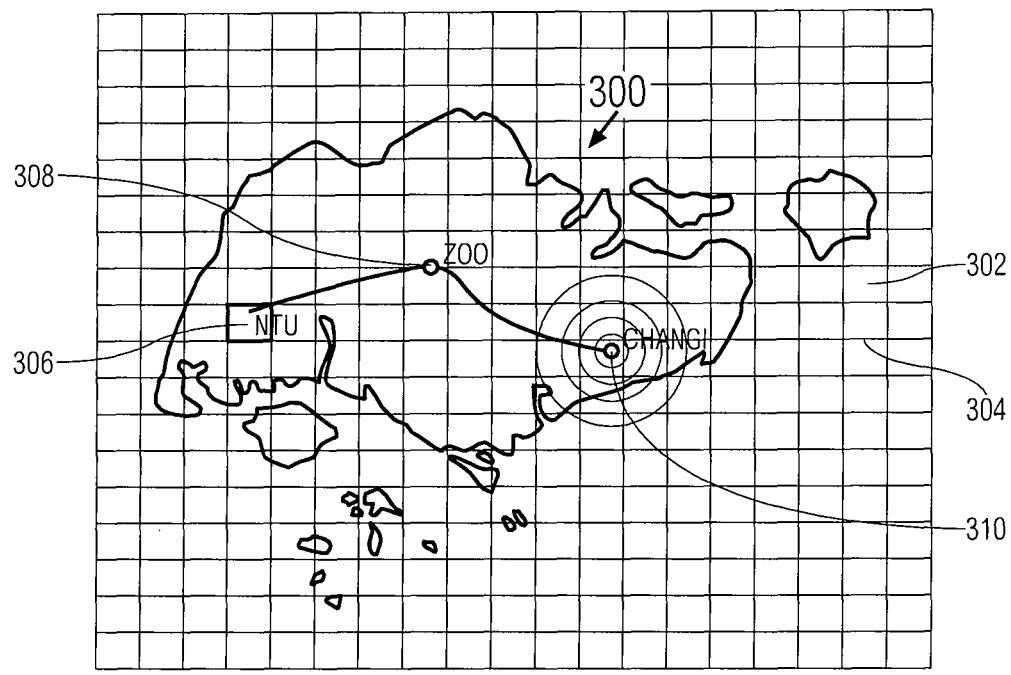
FIG. 3 is a schematic representation of zones.
Figure 4:
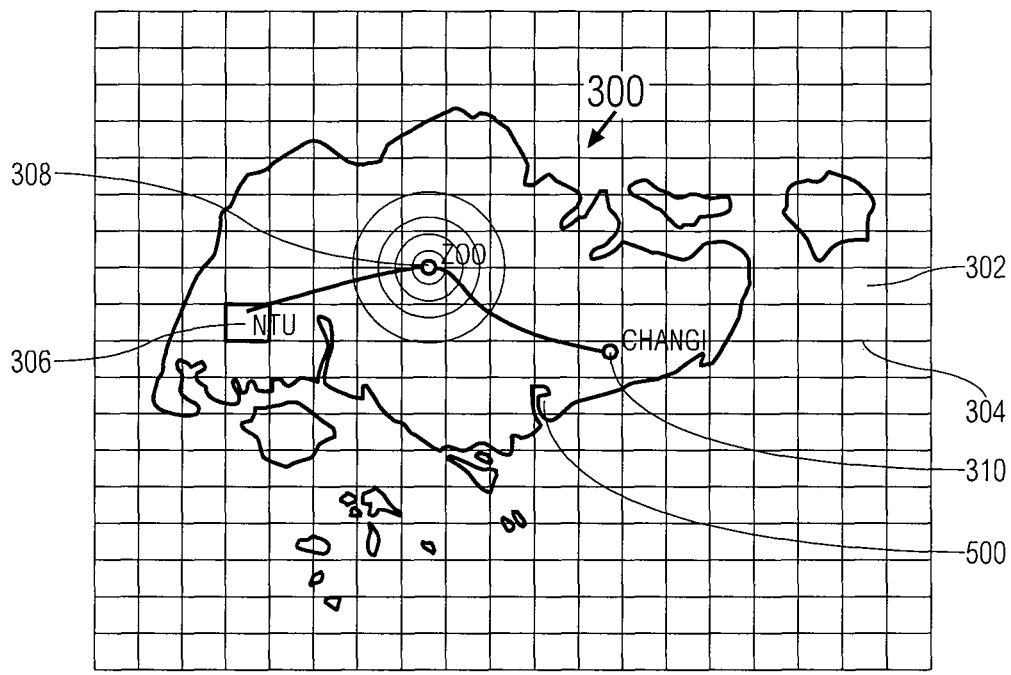
FIG. 4 is a representation corresponding to FIG. 3 with the viewer in a different zone.

FIGS. 3 and 4 show the nature of zones. Here the geographic location is Singapore and the zones 302 are formed by a standard square grid pattern 304. There are three locations identified: 306 being Nanyang Technological University, 308 being the Singapore Zoological Gardens, and 310 being Changi International Airport. In FIG. 3 the media player 100 is at location 310—Changi International Airport; whereas in FIG. 4 the media player 100 has moved to location 308—the Singapore Zoological Gardens. The film 112 may have scenes 128 for all three locations 306, 308, 310, but not for the intervening zones. In that case scenes can be played when travelling from one of the three locations 306, 308, 310 to another of the three locations 306, 308, 310 that are not location-specific. Such scenes may be of a similar nature to the preliminary scene 130. Alternatively, a "holding" message may be displayed; or advertisements and/or promotions could be played.

Figure 5:
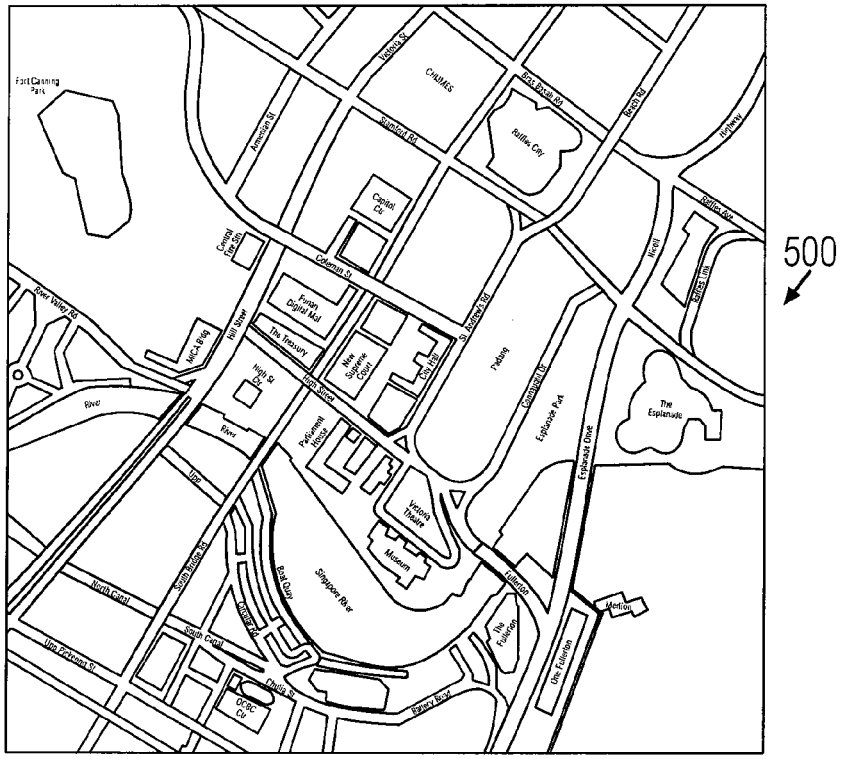
FIG. 5 is a street map of an exemplary location.
Figure 6:
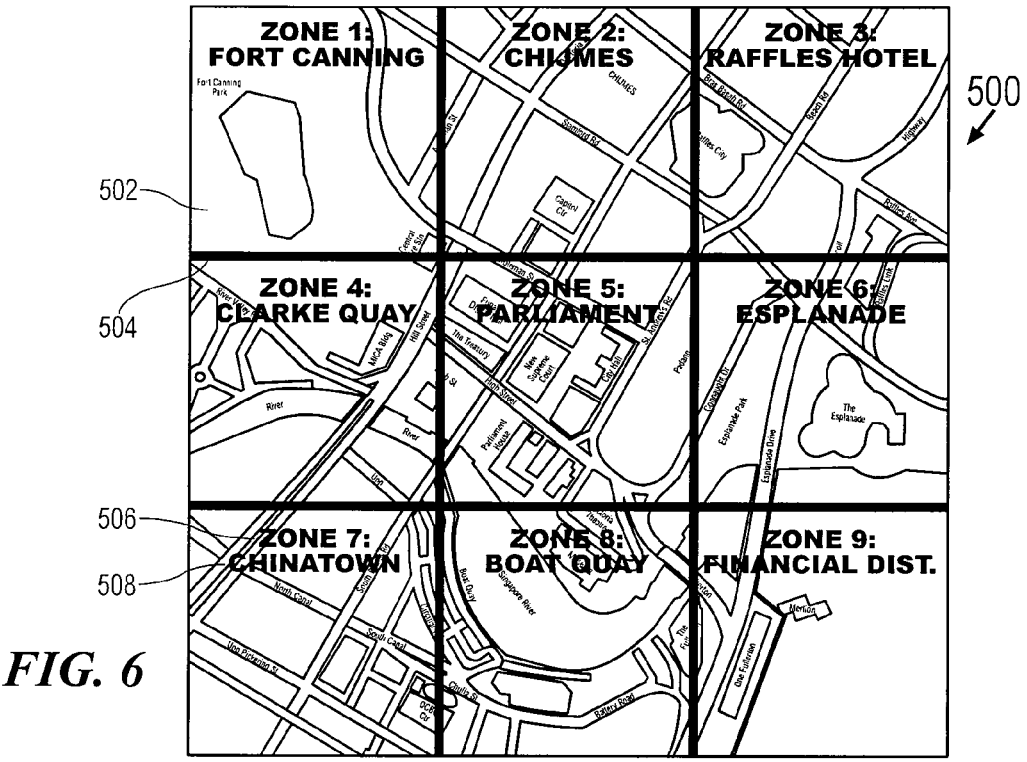
FIG. 6 is an illustration showing the exemplary street map of FIG. 5 divided into a number of zones.
Figure 7:
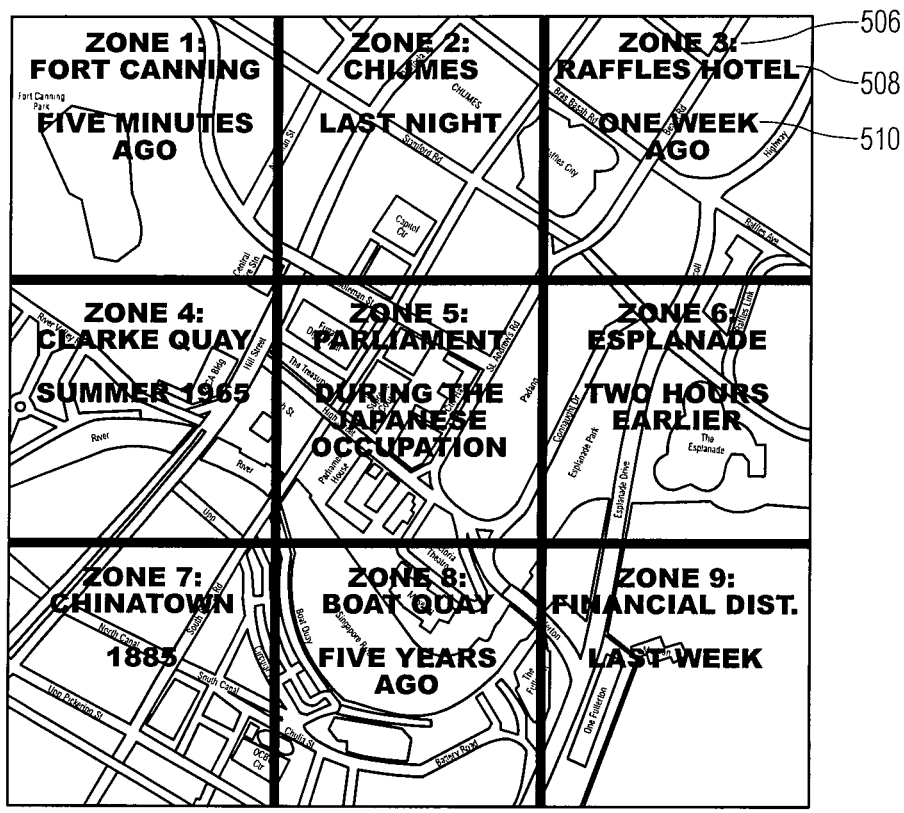
FIG. 7 is an illustration of the exemplary street map and zones of FIG. 6 with time periods for the film being given.

The zones 302 may be of a regular, fixed size, or may vary. For example, when dealing with a relatively large geographical area 300 of FIGS. 3 and 4 (approximately 265 square Km) the zones 302 may be regular and of a fixed size. FIGS. 5 to 7 show a geographic area 500 that is much smaller—it is approximately as large as one zone 302 of FIGS. 3 and 4. The geographic area 500 may be one of the zones 302. The geographic area 500 has a plurality of zones 502 formed by a standard, square grid pattern 504. Each of the zones 502 may be a sub-zone of the zone 302.

Each zone 502 (and each of the zones 302) has a unique identifier. In FIG. 6 each zone 502 has been given a unique number 512 and title 514. Each zone may have either, or both, the number 512 and title 514. The title 514 is relevant for a characteristic of the zone 502. In most cases the characteristic is a prominent building or building complex (e.g. Raffles Hotel, Parliament, Esplanade), a local name (e.g. Chinatown, Clark Quay, and Boat Quay), a former use (e.g. CHIJMES, Fort Canning), or general description (e.g. Financial District). In this instance all the zones 502 are of equal size and shape. However, they may be of different sizes and/or different shapes.

In FIG. 7 there is shown the area 500 with the zones 502 and grid 504, as well as the number 506 and title 508. In addition, each zone 502 is given a summation 510 that describes in a general sense the scenes 134, 136 linked to that zone 502. As shown, the summation 510 may indicate a period or time setting for the scene (e.g. 5 minutes ago). When the media player 100 moves into a new zone, that summation 510 is shown, then the first scene 134. Alternatively, the summation 510 may be shown as part of the first scene 134.

Figure 8:
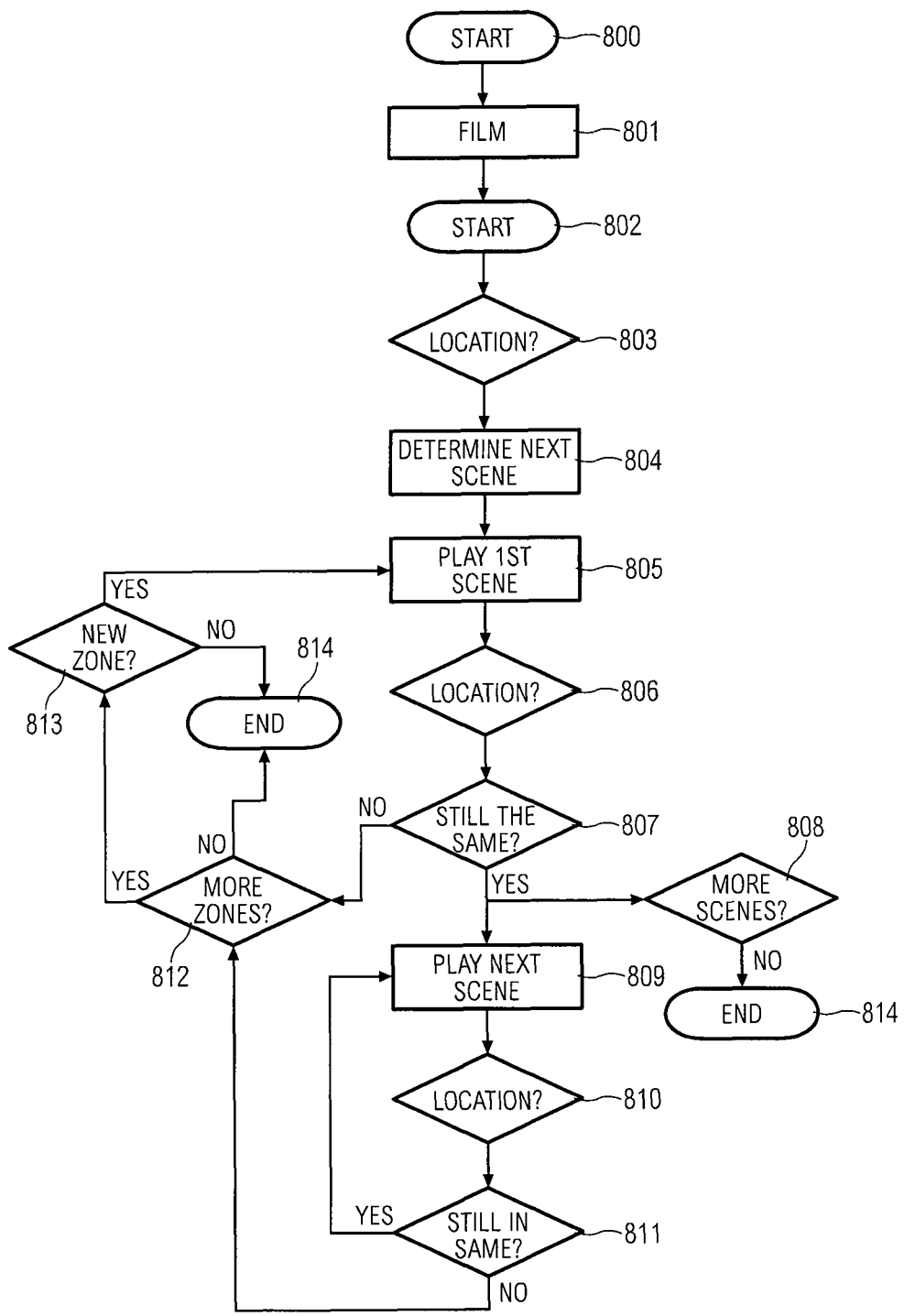
FIG. 8 is a flow chart for the method of operation of the exemplary embodiment of FIGS. 1 to 7.

FIG. 8 shows the work flow. This will be described using the example of a film 112 relating to a bank robbery.

The media player 100 is switched on the start the film 112 (800) and the viewer selects the film 112 (801) if there is more than one film using icons or a drop-down menu. The film 112 then starts to play (802). The preliminary scene 130 then plays (after any introduction). The GPS module 104 is then used to determine the location of the media player 100 (803). The processor then checks the database 102 for the scene(s) corresponding to the location of the media player (804). When the preliminary scene (e.g. the bank robbery) is played, the scenes for the location are played as is described above (805). The scenes 134, 136 provide information regarding the preliminary scene 130 and that are linked to the location of the media player 100. For example, if in Zone 3, raffles Hotel, the scenes 134, 136 may be showing the final meeting of the bank robbers meeting one week ago planning the bank robbery. The GPS module 104 again determines the location of the media player 100 (806) and whether that location is in the same zone (807). If yes, the scenes 134, 136 continue (809) with the GPS module again determining the location of the media player 100 (810) and whether that location is in the same zone (811). If yes, the process reverts to (809). If no at (811) a determination is made if there are any more zones by reference to the database 102 and the zone data 138 (812). As the media player 100 may have moved through all zones 502, there may be no more zones 502 so there are no more scenes 128 to be played. In that case, the film 112 ends (814).

If there are more zones the processor determines the identity of the new zone by reference to the zone data 138 in database 102 (813). The process reverts to (805) and the first scene 134 for the new zone is played. If no at (807) the process reverts to (812) and follows the flow as described above.

If the new zone is Zone 2, CHIJMES, Last Night, the scenes 134, 136 may be about a dream the robbery leader had the night before the robbery. Other possible scenes 134, 136 in the different zones 502 may include, for example, the main robber's girlfriend plotting to double cross him five years earlier (Zone 8); the creation of a flaw in the bank's security during construction of the building in 1885 (Zone 7); and so firth. Each zone 502 has linked to it scenes 134, 136 that reveal more information about the preliminary scene 130 to provide greater understanding, and a more powerful experience in viewing the film 112.

The preliminary scene 130, and the film 112, may be of any suitable nature provided there is a link between the subsequent scenes 132 and the preliminary scene 130; and there is a link between each of the scenes 132 and varying locations in the geographic area, each location being defined by a zone. For example, the preliminary scene 130 may be of an elderly couple gazing at a beautiful landscape. The scenes 132 may show the handing down from mother-to-daughter of a family heirloom; and important events in the life of the couple (wedding, birth of daughter, handing over of the heirloom to the daughter, and so forth). They may be historical and may show events such as a preliminary scene 130 of modern Singapore and the subsequent scenes 132 being of the major events in its history that took place at the various locations. It could be futuristic with the subsequent scenes being concepts of what the location may be like well into the future.

The media player 100 may be able to display the film 112 and/or the map 300 and grid 304 with the location of the media player relative to the map 300 as determined by GPS module 104 also being displayed on the map 300. This may be by use of known split screen technology or by sequential display by toggling between the film 112 and the location map 300. In this way it is possible to determine or see how close the media player 100 is to the next zone 302. A definition of the story for each zone 302, or for only the zone 302 in which the media player 100 is located, may also be displayed with the map 300. The definition may be the title of the scene or story. The definition of the story for each immediately adjacent zone 302 may also be displayed with the map 300.

The present invention also extends to a film configured in a preliminary scene and a plurality of subsequent scenes all linked to the preliminary scene and to a plurality of locations, as is described above.

The invention also includes a computer useable medium comprising a computer program code that is configured to cause a processor to execute one or more functions to enable a media player to play a film in the manner described above. The film may be in a suitable digital format and may be stored on a computer useable medium comprising a computer program code that is configured to cause a processor to execute one or more functions to enable a media player to play the film.

Whilst there has been described in the foregoing description exemplary embodiments, it will be understood by those skilled in the technology concerned that many variations in details of design, construction and/or operation may be made without departing from the present invention.

The invention claimed is:

1. A portable media player comprising a central processor, a GPS module configured to determine a location of the media player; and a storage configured to store film data of the film for playing on the media player, as well as location data of a plurality of locations in a geographic area; the film data comprising at least one preliminary scene and a plurality of subsequent scenes, each of the subsequent scenes being linked to both the preliminary scene and one of the locations, wherein the location data forms part of the film data, and wherein when the media player moves from a first zone to a second zone, the scenes of the plurality of subsequent scenes being played are changed from those linked to the first zone to those linked to the second zone.

2. A portable media player as claimed in claim 1, wherein each of the plurality of locations is defined by a zone of a plurality of zones.

3. A portable media player as claimed in claim 2, wherein each of the plurality of zones is defined by a grid pattern.

4. A portable media player as claimed in claim 2, wherein each of the subsequent scenes is linked to one of the zones of the plurality of zones.

5. A portable media player as claimed in claim 2, wherein each of the subsequent scenes for the zone comprise a first scene to be played first and at least one further scene to be played after the first scene.

6. A portable media player as claimed in claim 5, wherein the first scene and the at least one further scene are of differing durations.

7. A portable media player as claimed in claim 2, wherein each of the plurality of zones has at least one selected from the group consisting of a unique identifying number, a unique identifying title, and a summation of the scenes linked to that zone.

8. A method for playing a film on a portable media player, the method comprising: playing a preliminary scene of the film; using a GPS module and a processor of the portable media player to determine a location of the portable media player within a geographic area; and playing at least one subsequent scene of a plurality of subsequent scenes, each of the subsequent scenes being linked to both the preliminary scene and a location of a plurality of locations within the geographic area, wherein data of each of the plurality of locations forms part of data of the film, and wherein when the media player moves from a first zone to a second zone, the scenes of the plurality of subsequent scenes being played are changed from those linked to the first zone to those linked to the second zone.

9. A method as claimed in claim 8, wherein each of the plurality of locations is defined by a zone of a plurality of zones.

10. A method as claimed in claim 9, wherein each of the plurality of zones is defined by a grid pattern.

11. A method as claimed in claim 10, wherein the portable media player also displays a map of the geographic location with the grid pattern on the map, the location of the media player relative to the map as determined by the GPS module also being displayed on the map to determine how close the media player is to the next zone.

12. A method as claimed in claim 11, wherein both the film and the map are displayed using split screen technology.

13. A method as claimed in claim 11, wherein the film and the map are sequentially displayed by toggling between the film and the map.

14. A method as claimed in claim 9, wherein each of the subsequent scenes is linked to one of the zones of the plurality of zones.

15. A method as claimed in claim 9, wherein each of the subsequent scenes for the zone comprise a first scene to be played first and at least one further scene to be played after the first scene.

16. A method as claimed in claim 15, wherein the first scene and the at least one further scene are of differing durations.

17. A method as claimed in claim 9, wherein each of the plurality of zones has at least one selected from the group consisting of: a unique identifying number, a unique identifying title, and a summation of the scenes linked to that zone.

18. A method as claimed in claim 17, wherein the media player moves randomly within the geographic area, the scenes of the plurality of subsequent scenes being played in the order of the zones through which the media player passes.

19. A method as claimed in claim 8, wherein each of the plurality of subsequent scenes is independent of the other of the plurality of subsequent scenes but is linked to, and is used to reveal more information about, the at least one preliminary scene.

20. A method as claimed in claim 19, wherein a definition of the scene for the zone in which the media player is located is also be displayed with the map.

21. A system for playing a film on a portable media player, the portable media player comprising a central processor, a GPS module to determine a location of the portable media player within a geographic area, and a storage having stored therein film data of the film for playing on the portable media player, as well as location data of a plurality of locations in a geographic area; the film data comprising at least one preliminary scene to be played first, and a plurality of subsequent scenes, each of the subsequent scenes being linked to both the preliminary scene and one of the locations, wherein the location data forms part of the film data, and wherein when the media player moves from a first zone to a second zone, the scenes of the plurality of subsequent scenes being played are changed from those linked to the first zone to those linked to the second zone.

22. A system as claimed in claim 21 wherein each of the plurality of locations is defined by a zone of a plurality of zones.

23. A system as claimed in claim 22, wherein each of the plurality of zones is defined by a grid pattern.

24. A system as claimed in claim 22, wherein each of the subsequent scenes is linked to one of the zones of the plurality of zones.

25. A system as claimed in claim 22, wherein each of the plurality of zones has at least one selected from the group consisting of: a unique identifying number, a unique identifying title, and a summation of the scenes linked to that zone.

26. A system as claimed in claim 25, wherein the media player moves randomly within the geographic area, the scenes of the plurality of subsequent scenes being played in the order of the zones through which the media player passes.

27. A system as claimed in claim 21, wherein each of the subsequent scenes for the zone comprise a first scene to be played first and at least one further scene to be played after the first scene.

28. A system as claimed in claim 27, wherein the first scene and the at least one further scene are of differing durations.

29. A system as claimed in claim 21, wherein each of the plurality of subsequent scenes is independent of the other of the plurality of subsequent scenes but is linked to, and is used to reveal more information about, the at least one preliminary scene.

30. A non-transitory computer usable medium storing a computer program code that is configured to cause a processor to execute one or more functions to enable a portable media player to play a film in accordance with the method of claim 8.

* * * * *